Oct. 27, 1936.                W. BUIRK                 2,058,951
                     PRESSURE CONTROL MECHANISM
                        Filed July 24, 1935          2 Sheets-Sheet 1
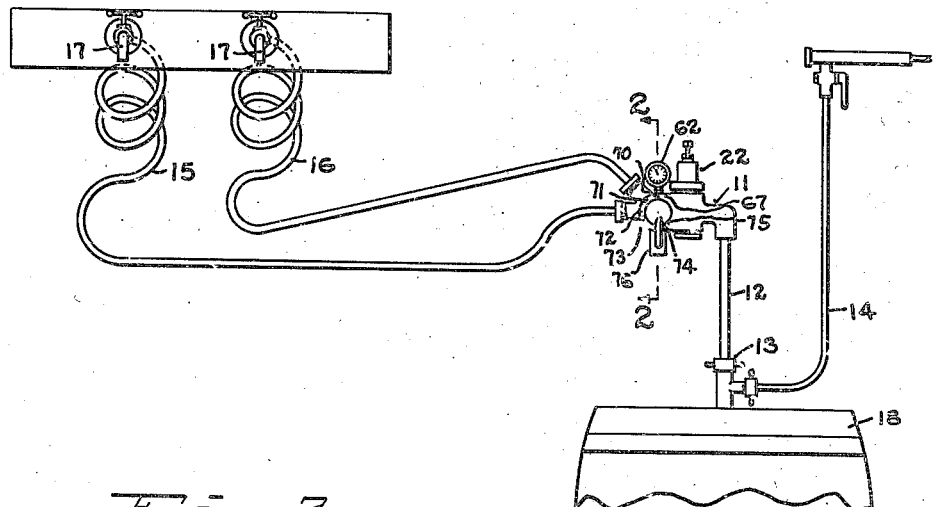
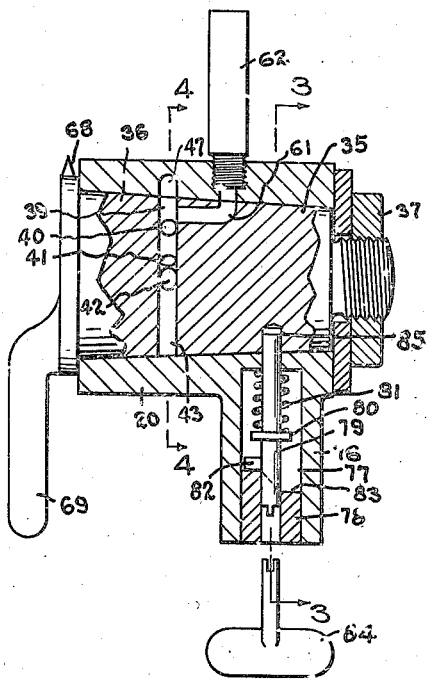
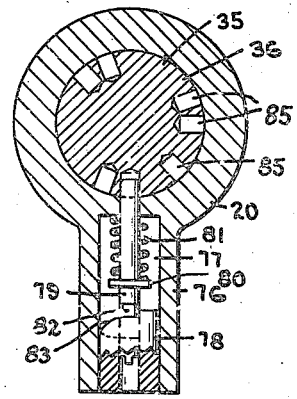
INVENTOR
WILLIAM BUIRK.
BY
W. C. Karel.
ATTORNEY

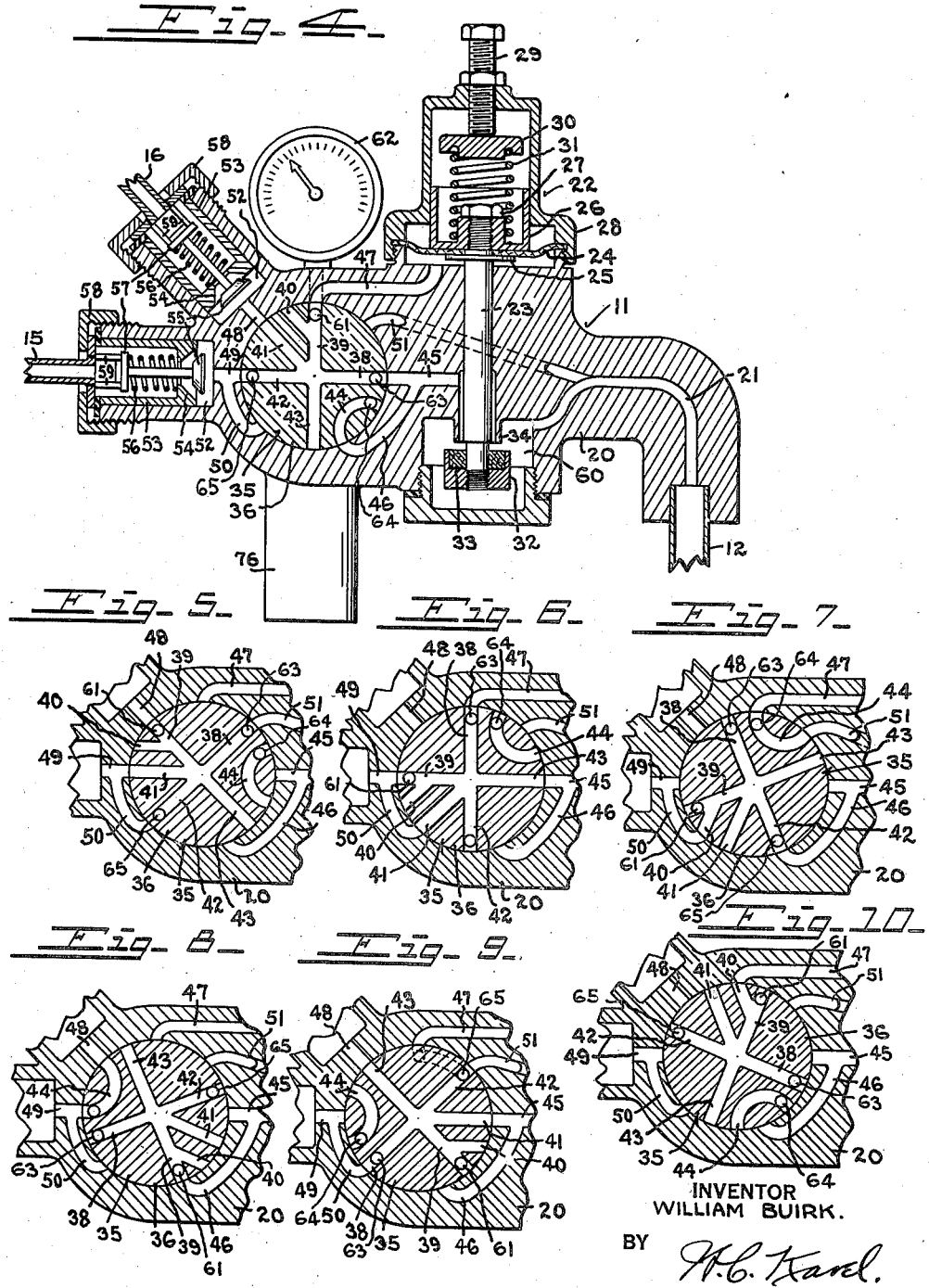

Patented Oct. 27, 1936

2,058,951

UNITED STATES PATENT OFFICE 2,058,951

PRESSURE CONTROL MECHANISM

William Buirk, St. Bernard, Ohio

Application July 24, 1935, Serial No. 32,913

12 Claims. (Cl. 225—3)

My invention relates to a new and useful mechanism for controlling the flow of fluid and the pressure applied thereto, with particular adaptation to a beer dispensing apparatus wherein it is desired to maintain the beer under a high pressure while in the barrel but dispensing it under a lower pressure. My invention also provides novel means for regulating the flow of fluid in various directions.

The object of my invention is to provide novel means for controlling the pressure on the liquid being dispensed. A further object is to provide means for directing the flow of fluid in selective channels. A further object is to provide means for closing the outlet ports when the connections thereto are removed. A further object is to provide means for locking the valve in any selective position.

My invention will be further readily understood from the following description and claims, and from the drawings in which latter:

Fig. 1 is a side elevation of my improved device, shown in connection with a beer dispensing apparatus.

Fig. 2 is a detail section of the valve, taken in the plane of the line 2—2 of Fig. 1.

Fig. 3 is a section view of the valve lock, taken in the plane of the line 3—3 of Fig. 2.

Fig. 4 is a longitudinal sectional view of the control mechanism, taken in the plane of the line 4—4 of Fig. 2.

Figs. 5, 6, 7, 8, 9, and 10 are detail sectional views, showing the various positions of the valve for accomplishing various results.

My improved device is indicated generally at 11, suitably fixed to the draught tube 12 of the usual tap 13, which has the usual air or carbonating pressure line 14 connected thereto. There are suitable outlets in my device to which the coils 15 and 16 for cooling the liquid being dispensed are connected, terminating at the outlet or dispensing faucets 17.

I have found that in many instances that if the beer on tap is not dispensed in a reasonable time it will go flat due to the fact that under present set ups it is impossible to maintain sufficient pressure on the barrel or cask 18 to keep it in salable condition or if a high pressure is maintained thereon the beer being dispensed will be wild or all foam. My improved device contemplates means for maintaining a high pressure on the contents of the barrel but permitting a limited pressure to be applied to the coils and the beer being dispensed. Thus a barrel can be kept on tap for a long period and maintain it in a salable condition.

My improved control mechanism comprises a body 20 having the draught tube securely fixed therein by any suitable means, and connecting to an inlet passage 21. I provide a regulating valve 22 within the body, for regulating the pressure of the fluid passing through the device. This regulating valve comprises a stem 23 having a diaphragm 24 secured to the upper end of the stem between a shoulder 25 and a guide sleeve 26 being clamped thereto by a nut 27. The outer part of the diaphragm is clamped between the body and an enclosing housing 28. An adjusting bolt 29 is threaded into the upper portion of the housing and bears against a spring retainer 30. A pressure spring 31 is between the retainer and the sleeve 26 for creating the desired pressure on the diaphragm by adjusting the bolt 29. A clapper valve 32 is secured to the lower end of the stem 23 and has a closing disc 33 arranged to seat against the projecting flange 34 of the body.

A directional control valve 35 comprises a tapered plug 36 extending through the body and held in position by a nut 37. The plug is provided with a plurality of interconnected channels 38, 39, 40, 41, 42, and 43 and a separate loop channel 44. About the valve plug are channels 45, 46, 47, 48, 49, 50 and 51 arranged to form various passages for the flow of fluid through the valve. The ports 48 and 49 terminate in enlarged openings 52 having sleeves 53 pressed therein to form valve seats 54 for valves 55 having springs 56 received between the valve seats and collars 57. The ends of the coils 15 and 16 have flanges to be clamped to the projecting part of the body portion by threaded nuts 58. The flanges of the coils have pins 59 to engage the collars on the valves for forcing the valves open when the coils are engaged to the body portion. When the coil is disengaged the valve will close thus preventing the escape of fluid.

With the valve in the position shown in Fig. 4, the fluid from the barrel passes through the draught tube 12 the passage 21 to the cavity 60 through the enlarged core about the valve stem to the passage 45, through the valve plug openings 38, 42, 41 and 39, to the coils 15 and 16 and to the cavity below the diaphragm. In this position there is also a connection 61 from the opening 39 to form a connection with a pressure gauge 62. With the valve in this position a high pressure can be maintained on the barrel with a lower pressure on the coils which will be indicated on the gauge.

With the valve in the position shown in Fig. 5, the fluid by-passes the regulating valve and flows through the passage 51, 38, 42 and 39 to the coils, or the fluid can be passed in the opposite direction.

With the valve in the position shown in Fig. 6, the fluid flows through the passage 45, 43, 39 to 49 to coil 15 also through 38 to 47 to the regulator, and through 63 to the pressure gauge.

With the valve in the position shown in Fig. 7, the fluid can be run in the reverse direction, with the regulator diaphragm operating through the pressure in the passage 21, this is accomplished by having the fluid flow from the port 49 through 50 to 40, 39, 42, 46, 45 to the cavity 60 thence to the passage 21. The regulating valve will operate through the back pressure passing through passage 51, the loop connection 44 to 47 for operating the diaphragm. Also fluid will pass through the opening 64 to the pressure gauge for indicating the pressure on the line 21.

With the valve set to the position shown in Fig. 8, the loop 44 will connect the ports 48 and 49 of the two outlet ports for forming a circuit between the two coils. This position is of advantage when cleaning the coils, the cleaning fluid can be pumped through one of the faucets 17 through the coils and out of the other faucet without disconnecting any of the connections to the beer supply.

With the valve set to the position shown in Fig. 9, the fluid flows through the passage 21 through 51 to 42 to 38 and 43 to the respective outlets, thus by-passing the pressure regulating valve. The port connection 65 from the passage 42 connects with the passage 61 to the indicator 62 for showing the pressure passing through the valve. With the valve set in this position the fluid can be circulated through the control mechanism in either direction.

The position of the valve shown in Fig. 10 is an off position, wherein all ports are closed. This position is indicated on the casing of the valve housing by the mark 67 to which a pointer 68 on the valve plug 36 can register to show the position of the valve plug. The valve plug is manipulated by a handle 69. The respective positions of the valve as shown in Figs. 4 to 9 inclusively are indicated on the outside of the valve housing by marks 70—71—72—73—74 and 75 respectively.

Means are also provided for locking the valve plug in various positions as indicated in Figs. 4 to 10 inclusively. This means comprises a tubular extension 76 on the valve housing having a bore 77 in the outer end of which a cam-sleeve 78 is suitably secured. A key 79 is received through the sleeve and is provided with a collar 80 intermediate thereof arranged to retain a spring 81 between the base of the bore and of the collar to normally urge the key 79 outwardly. The key is also provided with a lug 82 arranged to ride on the cam-face 83 of the sleeve. A suitable turning key 84, is arranged to engage the key 79 for turning the key and causing the key to move inwardly to engage one of the openings 85 in the valve plug.

Thus the supply of beer or the particular set-up of the valve can be assured by locking the valve in the proper position thus preventing felonious tampering with the supply.

With my improved mechanism a high pressure can be maintained on the barrel of beer for preserving the beer for long periods of time with a reduced pressure being applied to the beer passing through the coils to the dispensing faucets. Furthermore, numerous different arrangements can be set up to control the flow of beer or other fluid through various channels and in both directions. While I have shown my improved device connected to one barrel and having a pair of coils extending therefrom, it is obvious that the device can be modified to form connections to more than one barrel or one or more coils. Also, a second barrel may be attached to the regulating device in place of one of the coil connections when it is desired to connect more than one barrel of beer to a single coil.

In many establishments where the barreled beer is located in the basement considerable fluid is lost through employees and others disconnecting the coil from the tap rod and drawing beer therefrom. With my improved device as shown in Fig. 4, upon disconnection of the couplings 58, the shutoff valves 55 will immediately close preventing the beer under pressure to pass from the control mechanism.

It will also be noted that the regulator diaphragm will operate, controlled by the pressure of the fluid on either side of the valve. This is accomplished in one instance by the setting of the valve to the position shown in Fig. 7, and in the other instance in the various other positions of the valve.

Having thus fully described my invention, what I claim as new and desire to secure by Letters Patent, is:

1. In a pressure control mechanism, the combination of a housing, a valve plug in said housing having a plurality of connected passages, an inlet passage to said plug, and a pressure regulator operated through a separate passage connected to said plug and having a connected clapper valve operable on said inlet passage.

2. In a pressure control mechanism, the combination of a housing, a valve plug in said housing having a plurality of connected openings and a plurality of corresponding settable positions, an inlet passage to said plug, a pressure regulator operable on said inlet passage, a separate passage connecting said regulator with said plug, and means for locking said plug in any settable position.

3. In a pressure control mechanism, the combination of a housing, a valve plug in said housing having a plurality of connected passages, a plurality of passages in said housing about said plug, one of said passages being an inlet passage, a pressure regulator operable on said inlet passage, a separate passage having connection with said plug for operating said regulator, and means for turning said plug to connect various passages.

4. In a pressure control mechanism, the combination of a housing, a valve plug in said housing having a plurality of connected passages, a pair of inlet passages and a pair of discharge passages in said housing, a pressure regulator having a separate passage connecting with said plug, and a clapper valve in one of said inlet passages operated by said regulator.

5. In a pressure control mechanism, the combination of a housing, a valve plug in said housing having a plurality of connected passages, a pair of inlet passages and a pair of discharge passages in said housing, a pressure regulator having a passage connecting with said plug, a clapper valve in one of said inlet passages operated by said regulator, and a passage in said plug for forming a separate connection between a pair of passageways.

6. In a pressure control mechanism, the combination of a housing, a valve plug in said housing having a plurality of connected passages, a pair of inlet passages and a pair of discharge passages, shut-off valves in said discharge passages, tubes connected to said discharge passages provided with means for operating said valves, a pressure regulator having a passage connecting to said plug, a clapper valve in one of said inlet passages operated by said regulator, and a passage in said plug for forming a separate connection between a pair of passageways.

7. In a pressure control mechanism, the combination of a housing, a valve plug in said housing having a plurality of connected passages, inlet and outlet passages, shut-off valves in said outlet passages, means connecting to said outlet passages operating said valves, a pressure regulator having a passage connected to said plug, a clapper valve in one of said inlet passages operated by said regulator, a pressure gauge having a passage connecting with said plug, and a passage in said plug for forming a separate connection between a pair of passageways.

8. In a pressure control mechanism, the combination of a housing, a valve plug in said housing having a plurality of connected passages, inlet and outlet passages, shut-off valves in said outlet passages, means connected to said outlet passages for operating said valves, a pressure regulator having a passage connecting to said plug, a clapper valve in one of said inlet passages operated by said regulator, said other inlet passage forming a by-pass of said regulator, a pressure gauge having a passage connecting with said plug, and a passage in said plug for forming a separate connection between a pair of passageways.

9. In a pressure control mechanism, the combination of a housing, a valve plug in said housing having a plurality of connected passages, a plurality of passages in said housing terminating at said plug, a pressure regulator controlling the flow of fluid in either direction through one of said passages.

10. In a pressure control mechanism, the combination of a housing, a valve plug in said housing having a plurality of connected passages and an independent passage, a plurality of passages in said housing terminating at said plug, a pressure regulator controlling the flow of fluid in either direction through one of said passages.

11. In a pressure control mechanism, the combination of a housing, a valve plug in said housing having a plurality of connected passages, a plurality of passages in said housing terminating at said plug, a pressure regulator controlling the flow of fluid in either direction through one of said passages and means for locking said valve plug in any set position.

12. In a pressure control mechanism, the combination of a housing, a valve plug in said housing having a plurality of connected passages, a plurality of passages in said housing terminating at said plug, a pressure regulator controlling the flow of fluid in either direction through said mechanism, a pressure gauge having a passage to said plug, shut-off valves in a pair of said passages in said housing operable through means connecting thereto, and means for locking said valve plug in any set position.

WILLIAM BUIRK.